Jan. 16, 1923.  1,442,401.
A. GRIGAS.
AUTOMOBILE FENDER.
FILED OCT. 7, 1920.
2 SHEETS—SHEET 2.
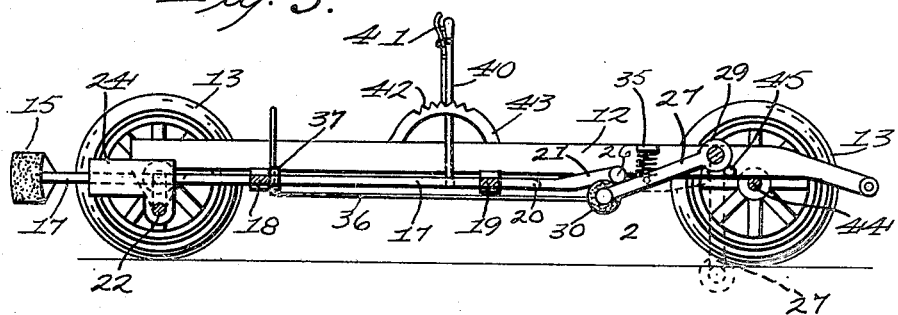
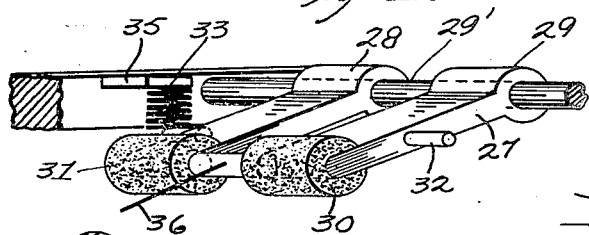
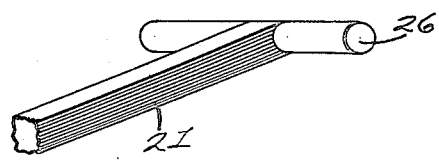
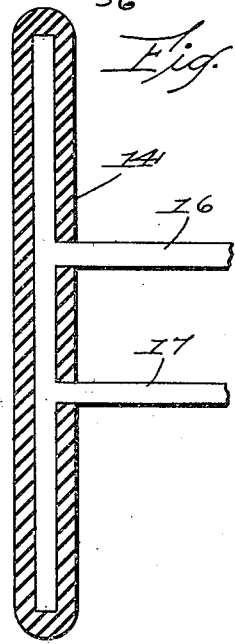
Inventor
Anthony Grigas
By his Attorney
George C. Heinrich Patented Jan. 16, 1923.

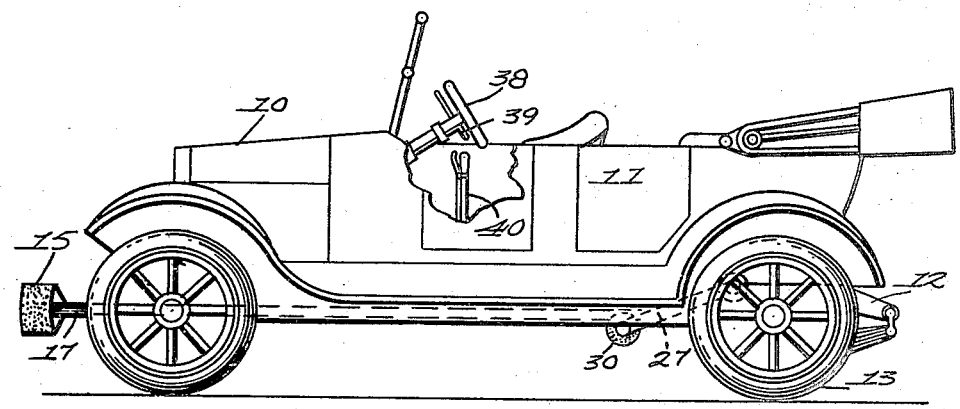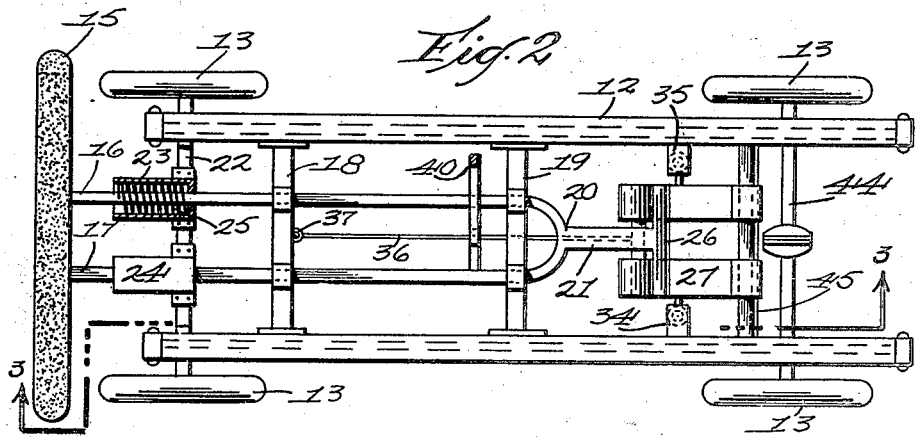

1,442,401

UNITED STATES PATENT OFFICE.

ANTHONY GRIGAS, OF WORCESTER, MASSACHUSETTS.

AUTOMOBILE FENDER.

Application filed October 7, 1920. Serial No. 415,303.

*To all whom it may concern:*

Be it known that I, ANTHONY GRIGAS, a citizen of Russia, residing at Worcester, county of Worcester, and State of Massachusetts, have invented certain new and useful Improvements in Automobile Fenders, of which the following is a specification.

This invention relates to improvements in automobile fenders, and it is the principal object of my invention to provide a fender which automatically stops the vehicle as soon as the fender meets an obstruction.

Another object of the invention is the provision of a fender which at the moment of meeting an obstruction in the road will raise the driving wheels from the ground and eventually also brake the front wheels.

A still further object of the invention is the provision of a fender which can be readily brought back into its position of rest after its operation.

Other objects and advantages of the invention will become apparent as the description proceeds, reference being had to the accompanying drawings, in which—

Figure 1 is a side view of an automobile equipped with a fender constructed according to the present invention.

Figure 2 is a top plan view thereof after removal of the chassis.

Figure 3 is a side view of an automobile truck, taken along line 3—3 of Figure 2, provided with a fender constructed according to the present invention.

Figure 4 is a perspective detail view of a supporting frame.

Figure 5 is a detail view of a frame extension.

Figure 6 is a top plan view of the fender partly in section.

A car 10 provided with the customary chassis 11 supported by a truck 12 on wheels 13 is equipped at the front end of the truck with a fender 14 provided with a rubber coat or casing 15 and secured to the front end of two sliding bars 16 and 17. These bars slide in suitable cross-bars 18 and 19 of the truck 12 and are united at their rear end as at 20 to form a single bar 21.

Intermediate the front bar 18 and the axle 22 of the front wheels the bars 16 and 17 are guided through stuffing boxes or the like 23 and 24 in which springs 25 are coiled around the bars, fastened with their front ends to said bars and resting against the rear end walls of the box with their opposite ends.

The rear end of the bar 21 carries a cross bar 26 secured near the front ends of bars 27 to the same, the rear ends of which carry sleeves 28 and 29 rotatably secured to a cross bar 29′ of the truck 12. The front ends of the bars 27 carry before the cross-bar 26 rubber rollers 30 and 31.

Intermediate their ends the bars 27 are provided with pins 32 connected by strong springs 33 to brackets 34 and 35 secured to the truck to which the upper ends of these springs are fastened.

In order to allow a guiding of the frame 27 into its elevated normal position, a draw bar or cable 36 is provided, the inner front end of the cable is guided through an eye 37 and along the steering post where its upper end, beneath the steering wheel 38 is provided with a handle 39.

For emergency cases a lever 40 is provided in the middle of the truck secured with its lower ends to the bars 16 and 17, and a locking lever 41 is engaging the teeth 42 of a segment 43 secured upon the truck 12.

In operation, let it be assumed, that the fender 15 strikes an obstruction in the road, the fender and its rods 16 and 17 will be pressed inwardly against the action of the springs 25 and will depress the front end of the frame 27 rotating with its rear sleeves 28 and 29 around bar 29′ until its rollers 30 and 31 will strike the ground assuming the position indicated in dotted lines in Figure 3, thus elevating the truck and the rear axle 44 and the wheels 13 and stopping the forward drive of the car.

A stop 45 (Figure 3) is provided on the truck 12 to stop the rearward movement of the frame 27. It will be clear that the movement of the stop, as the frame 27 is off center, will create a slight backward movement of the frame 27 with the truck, so that the operation of the cable will be greatly facilitated.

Having thus described my invention, what I claim as new and desire to secure by Letters Patent of the United States, is—

An automobile fender of the character described comprising a spring controlled sliding frame, a cross-bar on the automobile truck near the rear wheels thereof, a supporting frame rotatably secured to said cross-bar at its rear end, a pair of rubber rollers at the front end of said last named frame, said sliding frame having a cross-bar at its rear end secured to said supporting frame behind the rubber rollers thereof, pins secured to the side bars of said frame, springs secured to said pins and to said truck for normally holding said supporting frame in its elevated position of rest, a stop for limiting the rearward movement of said supporting frame upon the operation thereof by the meeting of the fender by an obstruction, a cable secured to said supporting frame, and a handle on said cable for operating the same to draw said supporting frame into its normal elevated position, an emergency lever and a locking lever engaging a tooth segment for operating said supporting frame to lift the rear wheels of the automobile in emergency cases.

In testimony whereof I have affixed my signature.

ANTHONY GRIGAS.